United States Patent [19]
Craig

[11] 4,380,789
[45] Apr. 19, 1983

[54] ACTUATOR FOR A CONCEALABLE HEADLAMP ASSEMBLY

[75] Inventor: Gale M. Craig, Anderson, Ind.

[73] Assignee: General Motors Corporation, Detroit, Mich.

[21] Appl. No.: 211,375

[22] Filed: Nov. 28, 1980

[51] Int. Cl.³ .............................................. B60Q 1/06
[52] U.S. Cl. ....................................... 362/65; 362/66; 362/272; 362/420; 362/428
[58] Field of Search ...................... 362/57, 59, 61, 63, 362/65, 66, 80, 83, 269, 272, 420, 421, 428

[56] References Cited
U.S. PATENT DOCUMENTS

| | | | |
|---|---|---|---|
| 2,516,052 | 7/1950 | Farr | 362/65 |
| 3,361,901 | 1/1968 | Mesler | 362/65 |
| 3,532,872 | 10/1970 | Hall | 362/65 |
| 4,246,628 | 1/1981 | Ikemizu | 362/65 |

Primary Examiner—Donald P. Walsh
Attorney, Agent, or Firm—Edward J. Biskup

[57] ABSTRACT

A concealable headlamp assembly and an actuator therefor that provides an increased force output for moving the headlamp assembly from the concealed position to the exposed position when opening movement of the headlamp assembly is resisted.

2 Claims, 8 Drawing Figures

ACTUATOR FOR A CONCEALABLE HEADLAMP ASSEMBLY

This invention concerns concealable headlamp assemblies in general and, more particularly, relates to an actuator for moving the headlamp assembly from a concealed position to an exposed position.

More specifically, the actuator made in accordance with the present invention is combined with a vehicle body having a pair of openings formed on opposite sides of the longitudinal axis of the vehicle body. A headlamp assembly is located in each of the openings and includes a housing for a headlamp that is connected to the vehicle body for rotation between a concealed position wherein the headlamp is located within the vehicle body and an exposed position wherein the headlamp can project a beam of light forwardly of the vehicle body. The actuator is operably connected to the housing for moving the headlamp between the concealed and exposed positions and includes a motor having an output shaft which has a crank mounted thereon. The crank has an eccentric shaft and a cam rigidly formed thereon, with the eccentric shaft being connected to the housing through a pair of pivotally interconnected links. The arrangement of the crank and the links is such that when the housing resists opening movement, the rotation of the crank causes the eccentric shaft to translate the links along their longitudinal axes and provide an increased opening force which serves to move the housing to an intermediate position between the concealed and exposed positions. Thereafter, continued rotation of the crank causes the cam to engage one end of one of the links to rotate the latter-mentioned link about the center of the output shaft so that both links complete the movement of the housing to the exposed position.

The objects of the present invention are: to provide a new and improved actuator for a concealed headlamp assembly that provides an increased force output when the headlamp assembly resists movement to the exposed position; to provide a new and improved actuator for a concealed headlamp assembly that includes a motor-driven crank connected to a pair of links through an eccentric shaft in a manner so as to provide a two-stage force output when the headlamp assembly resists opening movement; to provide a new and improved actuator for a concealable headlamp assembly that is normally biased toward the exposed position by a spring and wherein a crank having a cam and an eccentric shaft formed thereon cooperates with a pair of links for augmenting the biasing force of the spring and moving the headlamp assembly to the exposed position; and to provide a new and improved concealable headlamp assembly which is combined with an actuator that senses resistance to opening movement and automatically increases the force for moving the headlamp assembly from the concealed position to the exposed position.

Other objects and advantages of the present invention will be apparent from a reading of the following detailed description when taken in conjunction with the accompanying drawings, wherein.

Figure 7:
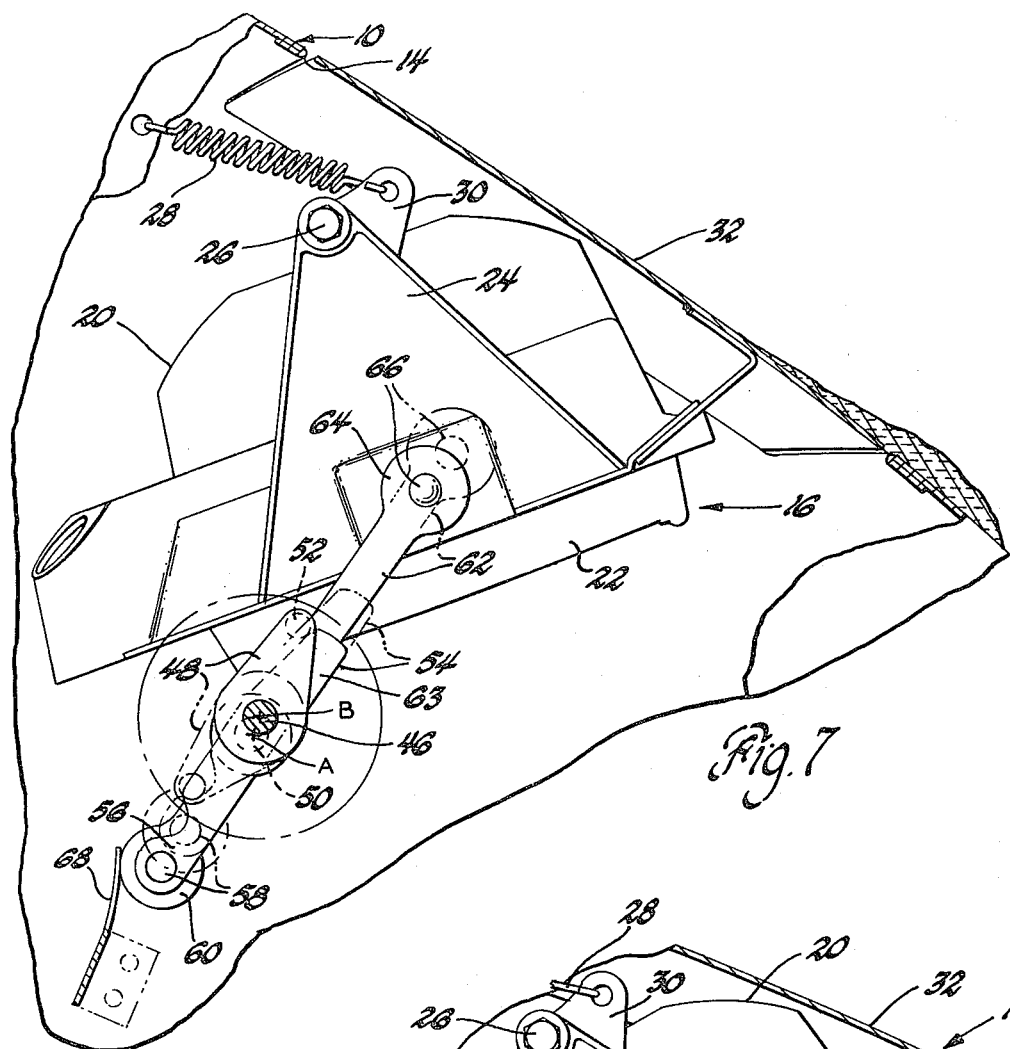
Figure 8:
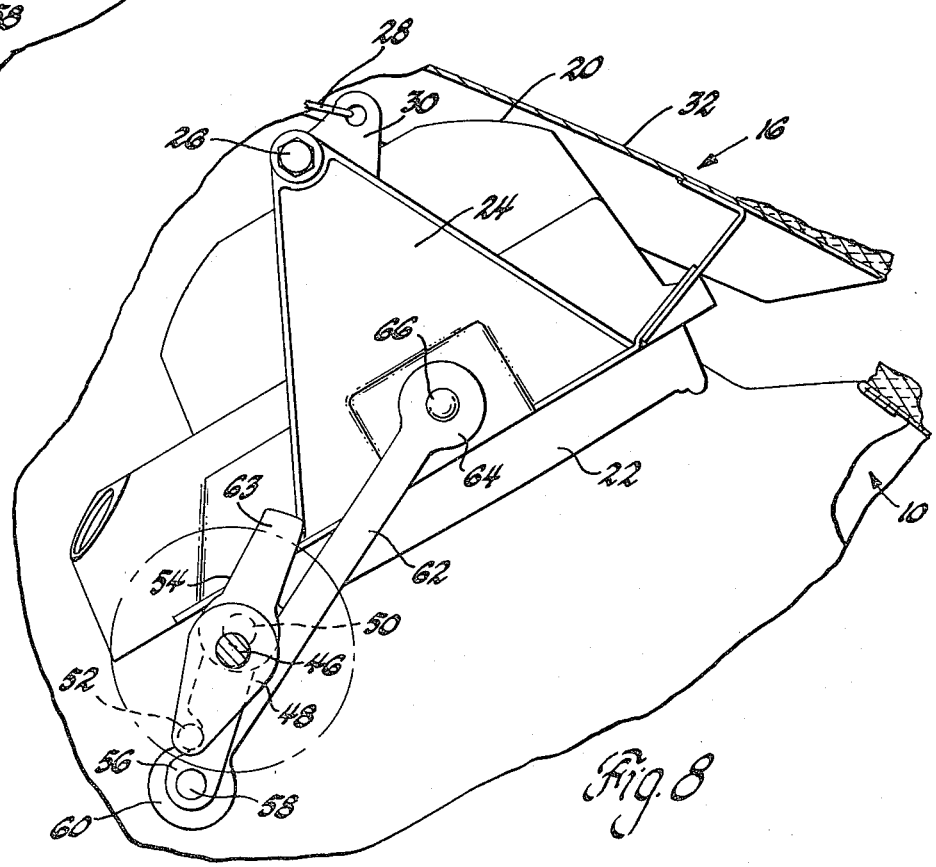

FIG. 7 is a side elevational view of the headlamp assembly and the linkage portion of the actuator with the headlamp assembly resisting opening movement due to formation of ice on the outer surface of the vehicle body; and FIG. 8 is a view similar to that shown in FIG. 7, but shows the relative position of the various elements of the linkage portion after the headlamp assembly is moved to a position intermediate the concealed and exposed positions.

Figure 1:
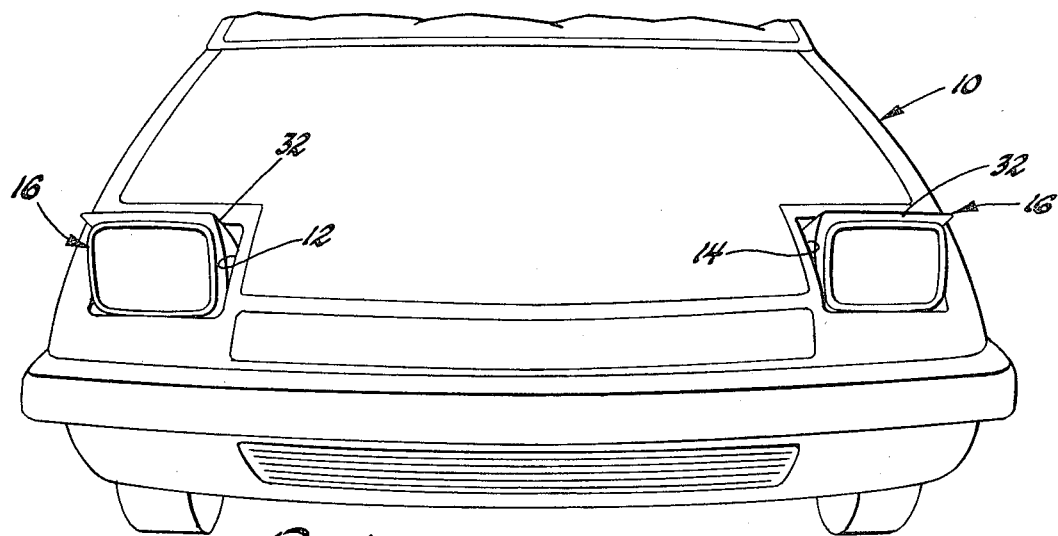
FIG. 1 is a frontal view of a vehicle body incorporating a pair of concealable headlamp assemblies each of which is located in the exposed position.

Referring now to the drawings and more particularly to FIG. 1 thereof, the front end of an automotive vehicle is shown having a sheet metal body 10, the forward end of which is provided with substantially rectangular openings 12 and 14 which are laterally spaced and located adjacent opposite sides of the body 10. Each of the openings 12 and 14 is provided with an identical headlamp assembly 16 which, as shown, is located in the exposed position, and is supported for rotational movement about an axis extending transversely to the longitudinal axis of the body 10.

Figure 2:
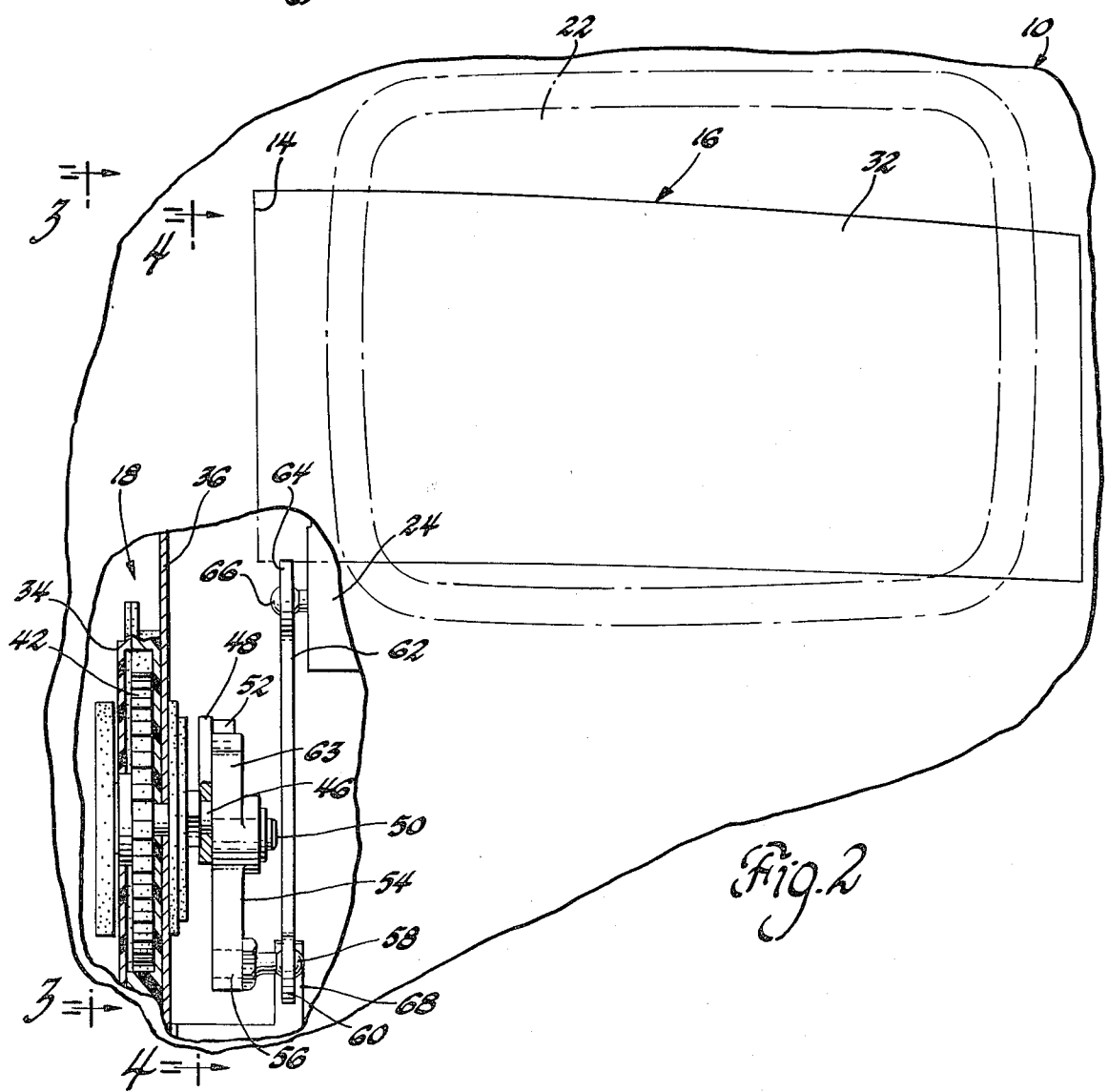
FIG. 2 is an enlarged view showing one of the headlamp assemblies of FIG. 1 in the concealed position and combined with an actuator made in accordance with the invention.

In addition and as best seen in FIG. 2, an identical actuator 18 made in accordance with the invention is provided adjacent each headlamp assembly 16 for rotating the associated headlamp assembly between the exposed position (shown in FIGS. 1 and 6) and a concealed position (shown in FIGS. 2, 3, 4, and 7).

Figure 3:
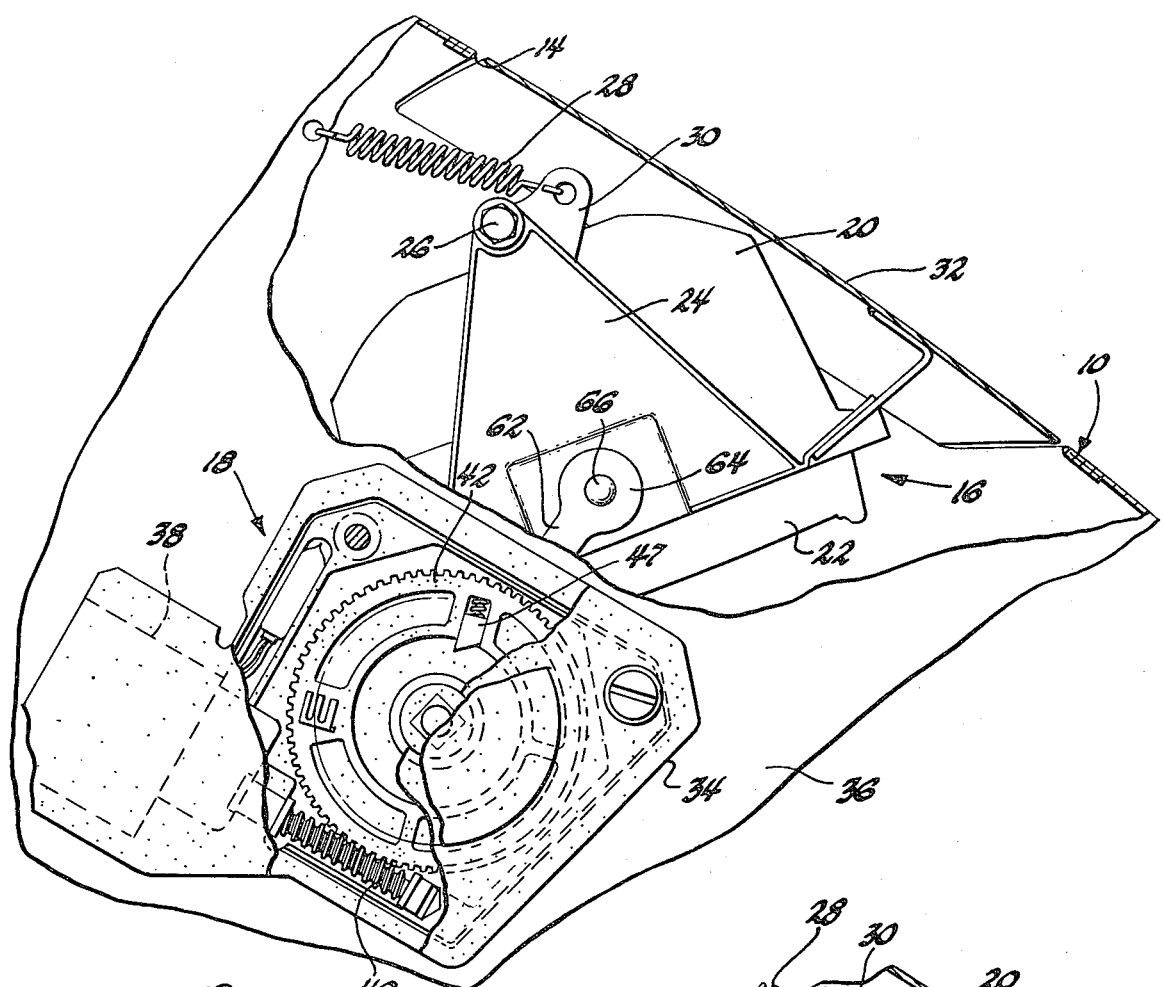
FIG. 3 is a side elevational view of the headlamp assembly and actuator shown in FIG. 2 and taken on line 3—3 thereof.

As seen in FIGS. 2 and 3, the headlamp assembly 16, located within the accommodating opening 14 formed in the sheet metal body 10, includes a housing 20 having a cavity therein which supports a rectangular sealed beam headlamp 22. Each side of the housing 20 is rigidly connected to an identical triangular bracket 24 (only one of which is shown in the drawings) that extends rearwardly for pivotal connection with the body 10 by a pivot shaft 26, the longitudinal axis of which is oriented so as to allow rotational movement of the headlamp assembly 16 about the aforementioned transverse axis. A coil spring 28 has one end thereof secured to the body 10 of the vehicle, while the other end is secured to an ear 30 rigidly connected to the bracket 24 adjacent the pivot shaft 26 so as to normally bias the headlamp assembly 16 towards the exposed position, or in a counterclockwise direction, as seen in FIG. 3. In addition, a rectangular cover 32 is rigidly secured to the top portion of the housing 20 and serves to conceal the accommodating opening in the sheet metal body 10 when the headlamp assembly 16 is in the concealed position of FIGS. 2, 3, and 4.

As seen in FIGS. 2 and 3, the actuator 18 includes a housing 34 which is secured to a plate 36 rigid with the sheet metal body 10 of the vehicle. The actuator 18 also includes an electric reversible motor 38 which rotatably drives a worm 40 which, in turn, drives a worm gear 42 rotatably supported within the housing 34. The worm gear 42 is connected to an output shaft 46 through a torque-limiting one-way clutch arrangement which includes a spring-pressed pawl 47. The output shaft 46 extends through an opening in the plate 36 and is rigidly connected to and rotatably drives a crank 48. The crank 48 has an eccentric shaft 50 fixed therewith adjacent one end thereof, while the other end of the crank 48 has a cam 52 rigidly formed therewith. The intermediate portion of a link 54 is rotatably mounted on the eccentric shaft 50 and has an end portion 56 thereof connected by a pivotal connection 58 to end portion 60 of a link 62, while the other end portion 63 of the link 54 is unattached and extends radially outwardly from the eccentric shaft 50 in substantial alignment with the end portion 56. The opposite end portion 64 of the link 62 is connected by a pivotal connection 66 to the bracket 24 fixed with housing 20 of the headlamp assembly 16.

Figure 4:
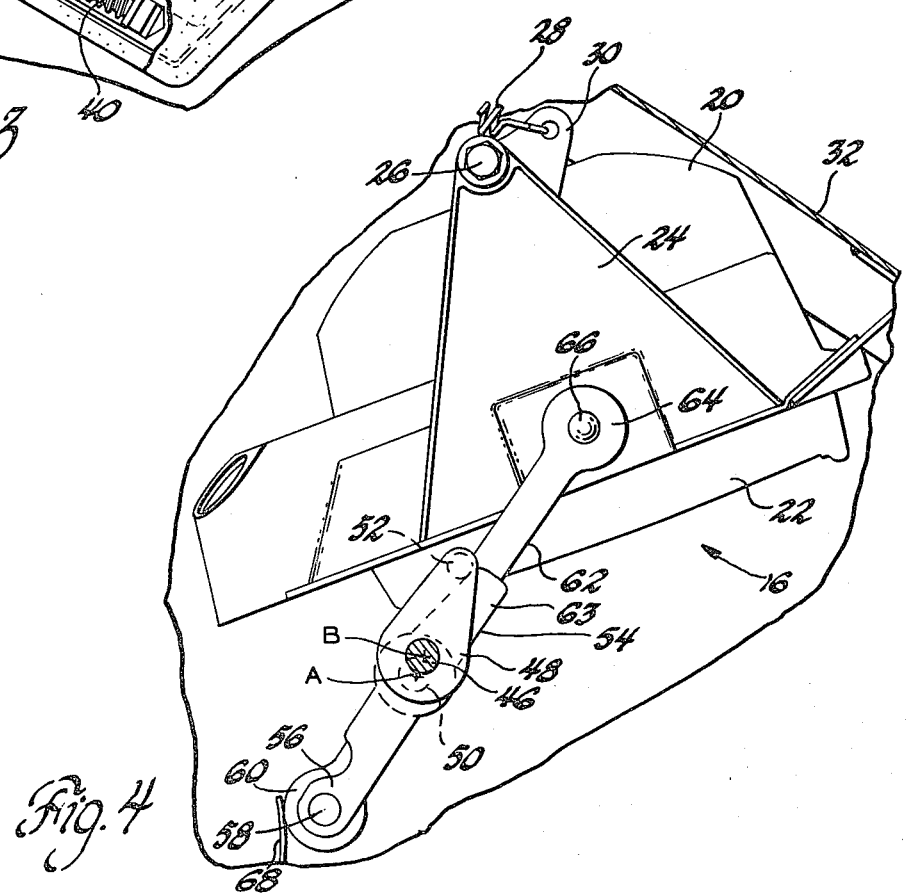
FIG. 4 is a side elevational view of the headlamp assembly taken on line 4—4 of FIG. 2 and shows the linkage portion of the actuator.
Figure 5:
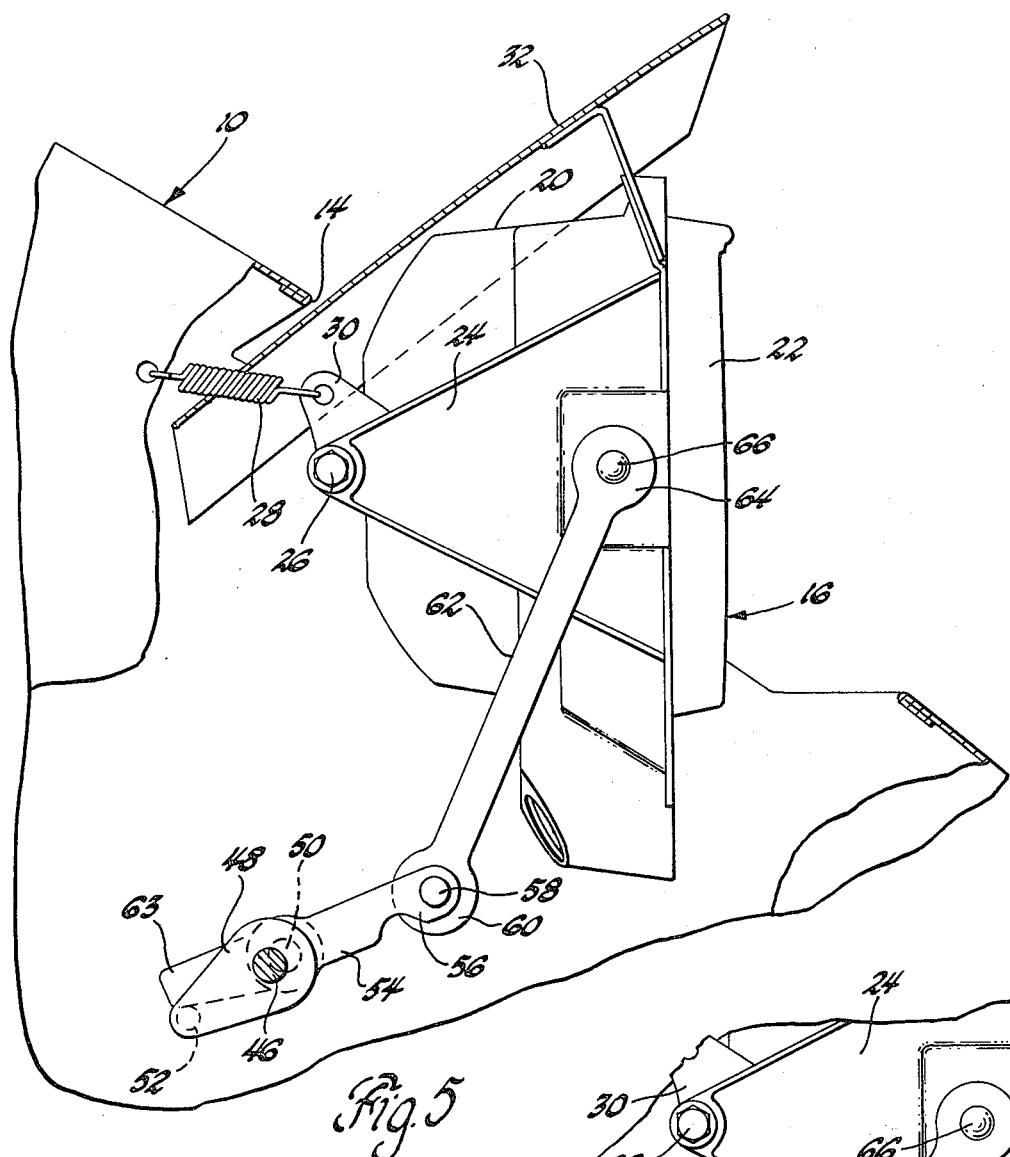
FIG. 5 is a view similar to FIG. 4, but shows the linkage portion of the actuator in one of the positions assumed during the movement of the headlamp assembly from the concealed position to the exposed position.
Figure 6:
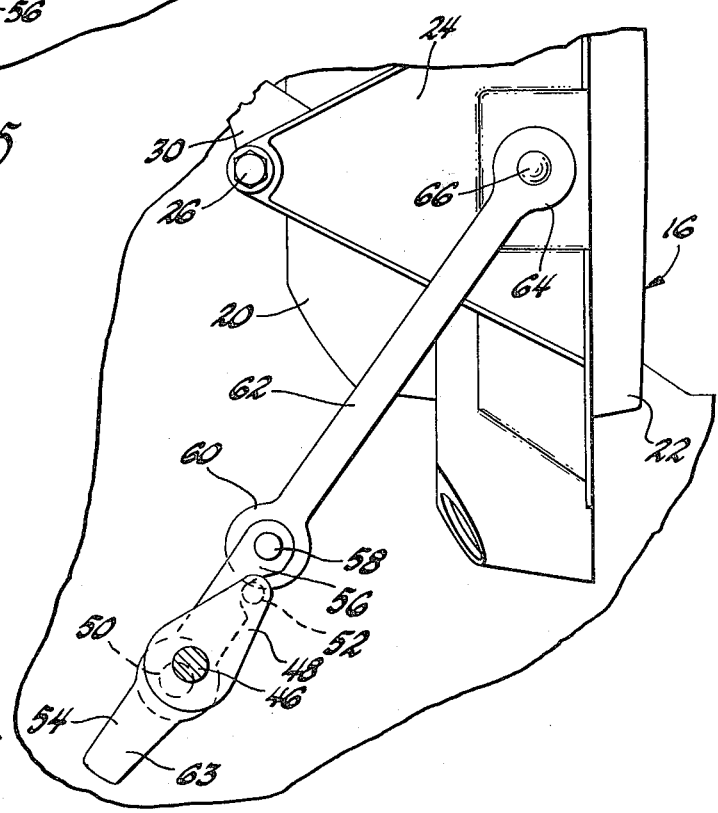
FIG. 6 is a view similar to FIG. 5, but shows the linkage portion of the actuator when the headlamp assembly is in the fully exposed position.

As aforementioned, the actuator 18 serves to rotate the headlamp assembly 16 between the concealed position shown in FIGS. 2 and 3 wherein the headlamp 22 is located within the sheet metal body 10, and an exposed position, as seen in FIGS. 5 and 6, wherein the headlamp 22 projects a beam of light forwardly of the vehicle body 10. In this connection and as best seen in FIGS. 2 through 4, when the headlamp assembly 16 is in the concealed position, the links 54 and 62 are located alongside of and in general alignment with each other, with the end portion 60 of link 62 pressed against a leaf spring 68 mounted on the sheet metal body 10. This can be seen in FIG. 4 wherein the center "A" of the eccentric shaft 50 is located between the pivotal connections 58 and 66 and along an imaginary straight line interconnecting the centers of the pivotal connections 58 and 66. At the same time, the cam 52 is located above the center of the output shaft 46 and in engagement with end portion 63 of the link 54. When the electric motor 38 is energized so as to move the headlamp assembly 16 from the concealed position of FIGS. 3 and 4 to the exposed position of FIGS. 5 and 6, the worm gear 42 is initially driven in a counterclockwise direction (as seen in FIG. 3). This movement of the worm gear 42 causes the crank 48 (as seen in FIG. 4) to rotate about the center "B" of the output shaft 46 in a counterclockwise direction and allows the coil spring 28 to urge the headlamp assembly 16 toward the exposed position (FIG. 6). Thus, as seen in FIG. 5, crank 48 continues to rotate in a counterclockwise direction, the links 54 and 62 merely serve as control members for allowing the coil spring 28 to rotate the headlamp assembly 16 about the aforementioned transverse axis passing through the pivot shaft 26 to the exposed position shown in FIGS. 5 and 6. It should be apparent that the coil spring 28 actually causes movement of the headlamp assembly 16 to the exposed position because (as seen in FIG. 4), as crank 48 rotates in a counterclockwise direction about the center "B" of the output shaft 46, it carries the cam 52 in a counterclockwise direction around the center "B". During such rotation of the crank 48, the cam 52 moves away from end portion 63 of the link 54—thereby permitting the leaf spring 68 to urge the lower end of the link 62 in a counterclockwise direction about the pivotal connection 66. As a result, pivotal connection 66, eccentric shaft 50, and pivotal connection 58 are no longer aligned—whereupon the coil spring 28, acting on the link 62 through the bracket 24, exerts a counterclockwise force on link 54 so that the link 54 follows the counterclockwise rotation of crank 48 and the links 54 and 62 assume the aligned positions shown in FIG. 6, at which point the cam 52 engages the end portion 56 of the link 54 adjacent pivotal connection 58.

As is conventional with actuators of this type, when the headlamp assembly 16 reaches the fully exposed position shown in FIG. 6, a limit switch (not shown) deenergizes motor 38 so that further rotation of crank 48 is discontinued. In addition, when the electric motor 38 is subsequently energized, the worm gear 42 and, accordingly the crank 48, is driven in a clockwise direction (as seen in FIG. 3) to return the headlamp assembly 16 from the exposed position to the concealed position. When the headlamp assembly 16 assumes the concealed position shown in FIGS. 2 and 3, a second limit switch (not shown) again deenergizes the electric motor 38.

FIG. 7 shows the headlamp assembly 16 in the concealed position, with the various elements of the linkage portion of the actuator 18 being located in the same positions as seen in FIG. 4. In this instance, however, the cover 32 of the headlamp assembly 16 has a portion thereof "iced over" so as to resist opening movement when the electric motor 38 is energized. Under such conditions it will be noted that when the crank 48 is driven in a counterclockwise direction, the center "A" of the eccentric shaft 50 "orbits" about the center "B" of the output shaft 46 causing the links 54 and 62 to be moved in an upward direction along their longitudinal axes so as to provide an increased force for moving the headlamp assembly 16 to the exposed position. In other words, both links 54 and 62 are translated "as a body" upwardly and assume the position shown in phantom lines in FIG. 7 as the crank 48 rotates approximately 180° in a counterclockwise direction. The cam 52 then engages the end portion 56 of link 54 adjacent the pivotal connection 58 (as seen in FIG. 8); and continued rotation of the crank 48 in a counterclockwise direction then causes the links 54 and 62—as well as the crank 48, to assume the positions shown in FIG. 6, at which time the headlamp assembly 16 is located in the exposed position.

It will be understood that once resistance to the opening movement of the headlamp assembly 16 is overcome, the links 54 and 62 and headlamp assembly 16 move to the exposed position in a manner previously explained in connection with the headlamp assembly 16 shown in FIGS. 5 and 6, under the urging of the coil spring 28. As alluded to hereinbefore, energization of the electric motor 38, after the headlamp assembly 16 assumes the exposed position shown in FIG. 6, causes the crank 48 to rotate in a clockwise direction and to have the cam 52 contact the end portion 63 of the link 54. The link 54 is then rotated by the crank 48 in a clockwise direction about the output shaft 46 causing the pivotal connection 66 and accordingly the link 62 to be moved downwardly until they assume the positions shown in FIG. 4, at which time the electric motor 38 is deenergized.

Various changes and modifications can be made in this construction without departing from the spirit of the invention. Such changes and modifications are contemplated by the inventor, and he does not wish to be limited except by the scope of the appended claims.

I claim:

1. In combination with a vehicle having a body, a pair of openings formed in the forward end of said body on opposite sides of the longitudinal axis of said body, a headlamp assembly including a housing located in each of said pair of openings and having a headlamp mounted therein; means connecting said housing to said body for rotation between a first position wherein said housing conceals the associated opening and a second position wherein said headlamp in said housing is exposed to project a beam of light forwardly of said body; an actuator for rotating said headlamp assembly from said first position to said second position; the improvement wherein said actuator comprises a motor connected to an output shaft, a crank rigidly mounted on said output shaft for rotation therewith, said crank having an eccentric shaft and a cam formed therewith; a first link having an intermediate portion thereof rotatably mounted on said eccentric shaft and having a first end portion and a second end portion; a second link, a first pivotal connection connecting one end of said second link to said first end portion of said first link, a second pivotal connection connecting the other end of said second link to said headlamp assembly; the arrangement of said first link, said second link and said crank being such that when the headlamp assembly is in said first position the center of said eccentric shaft and the center of said output shaft are located substantially in alignment with and between the centers of said first and said second pivotal connections and said cam is positioned between the center of said eccentric shaft and the center of said second pivotal connection in contact with said second end portion of said first link so when said housing of said headlamp resists opening movement, rotation of said crank approximately 180° in one direction causes corresponding rotation of said eccentric shaft resulting in translational movement of said first and second links along the longitudinal axes thereof towards said housing to provide an increased force which moves said headlamp assembly to an intermediate position between said first and second positions, after which continued rotation of said crank in said one direction causes said cam to contact said first end portion of said first link and rotate said first link about said center of said output shaft to allow said first link and said second link to complete the movement of said headlamp assembly to said second position.

2. In combination with a vehicle having a body, a pair of openings formed in the forward end of said body on opposite sides of the longitudinal axis of said body, a headlamp assembly including a housing located in each of said pair of openings and having a headlamp mounted therein; means connecting said housing to said body for rotation about an axis extending transversely to said longitudinal axis of said body and between a concealed position wherein said housing conceals the associated opening and an exposed position wherein said headlamp in said housing projects a beam of light forwardly of said body; an actuator for rotating said headlamp assembly from said concealed position to said exposed position; a spring normally biasing said headlamp assembly towards said exposed position, said actuator comprising an electric motor having an output shaft, a crank rigidly mounted on said output shaft for rotation therewith, said crank having an eccentric shaft and a cam mounted thereon; a first link having an intermediate portion thereof rotatably mounted on said eccentric shaft and having a first end portion and a second end portion; a second link, a first pivotal connection connecting one end of said second link to said first end portion of said first link, a second pivotal connection connecting the other end of said second link to said headlamp assembly; the arrangement of said first link, said second link and said crank being such that when said headlamp assembly is in said concealed position the center of said eccentric shaft and the center of said output shaft are located substantially in alignment with and between the centers of said first and said second pivotal connections and said cam is positioned between the centers of said eccentric shaft and said second pivotal connection in contact with said second end portion of said first link so when said housing resists opening movement, rotation of said crank approximately 180° in one direction causes corresponding rotation of said eccentric shaft to cause translational movement of said first and second links along the longitudinal axes thereof towards said housing and provide an increased force for moving said headlamp assembly to an intermediate position between said concealed and exposed positions, after which continued rotation of said crank in said one direction causes said cam to contact said first end portion of said first link and rotate said first link about the center of said output shaft to cause said spring to complete the movement of said headlamp assembly to said exposed position.

* * * * *